United States Patent
Sela (10) Patent No.: US 8,843,623 B2
(45) Date of Patent: Sep. 23, 2014

(54) METHODS, APPARATUSES, AND COMPUTER PROGRAM PRODUCTS FOR AUTOMATED REMOTE DATA COLLECTION

(75) Inventor: Shilo Sela, Tel Aviv (IL)

(73) Assignee: McKesson Financial Holdings, Hamilton (BM)

( * ) Notice: Subject to any disclaimer, the term of this patent is extended or adjusted under 35 U.S.C. 154(b) by 178 days.

(21) Appl. No.: 13/407,485

(22) Filed: Feb. 28, 2012

(65) Prior Publication Data

US 2012/0221717 A1    Aug. 30, 2012

(51) Int. Cl.
*G06F 15/16* (2006.01)
*G06F 11/22* (2006.01)
*H04L 12/26* (2006.01)

(52) U.S. Cl.
CPC .......... *G06F 11/2294* (2013.01); *H04L 43/12* (2013.01)
USPC .................................................. 709/224

(58) Field of Classification Search
USPC ........................................ 709/224, 220, 223
See application file for complete search history.

(56) References Cited

U.S. PATENT DOCUMENTS 6,145,096 A * 11/2000 Bereiter et al. .................. 714/25
6,473,794 B1 * 10/2002 Guheen et al. ................ 709/223

* cited by examiner

*Primary Examiner* — Joseph E Avellino
*Assistant Examiner* — Marshall McLeod
(74) *Attorney, Agent, or Firm* — Alston & Bird LLP (57) ABSTRACT

Methods, apparatuses, computer program products and other means are provided for systems that are configured to use remote connections to, for example, provide proactive support monitoring by running scripts (such as, e.g., diagnostic tests) and/or collecting data (such as diagnostic test result data) from one or more customer machines. The collected data can be received at a centralized location. The collected data can be analyzed by one or more other machines, used by a support team, sold to clients, and/or used in any other manner. For example, technical problems discovered from diagnostic test results data may be fixed by a support team before the symptoms of the problems are experienced by at least some of the customer's machines. Some embodiments may also be configured to perform fact based decision making.

19 Claims, 8 Drawing Sheets

Configuration XML file for Data Collector     400

```
<Account>
 <AccountGuidId>1234-GUID-5678</AccountGuidId>
 <AccountName>Medcon Office</AccountName>
 <DomainName>medcon</DomainName>
 <AdminUserName>qa</AdminUserName>
 <AdminPassword>McKesson8</AdminPassword>
 <CentralDbName>vmautotest1</CentralDbName>
 <IsCluster>False</IsCluster>
 <Stations>
        <Station>
   <StationGuidId>1234-GUID-0088</StationGuidId>
   <StationName>VMAUTOTEST1</StationName>
   <LongName>vmautotest1.medcon.com</LongName>
   <IPAddress>10. Xx.xx.xxx.xxx IPAddress>
   <Tasks>
    <Task>
     <TaskCodeName>BACKEND_LABS_GROUPS</TaskCodeName>
    </Task>
        <Task>
            <TaskCodeName>SQLServerCollation</TaskCodeName>
        </Task>
   </Tasks>
  </Station>
</Account>
```

FIG. 4

Results file in XML from Data Collector     500

```
<?xml version="1.0" encoding="UTF-8"?>
<Tasks>
 <Probe.Tasks.SQL_CRITICAL_ERROR_LAST_DAY>
  <SQL_CRITICAL_ERROR_LAST_DAY>
   <AccountIdentifier>9971a54b-4f60-df11-97ad-005056b52120</AccountIdentifier>
   <TaskDetails CodeName="SQL_CRITICAL_ERROR_LAST_DAY" />
   <Station Identifier ="36106783-7c7c-df11-ab0b-005056b52120" HostName ="hcsqlsrv1" />
   <IsError>False</IsError>
   <ErrorMessage></ErrorMessage>
   <ResultValue>
   </ResultValue>
   <ResultValueXmlFlag>False</ResultValueXmlFlag>
   <ExecutionDuration>00:00:01.0625068</ExecutionDuration>
   <ExecutionTimeOnSite>2010/12/07 05:55:30</ExecutionTimeOnSite>
  </SQL_CRITICAL_ERROR_LAST_DAY>
 </Probe.Tasks.SQL_CRITICAL_ERROR_LAST_DAY>
</Tasks>
```

Adding new Spider Task

FIG. 7A

Adding new Spider Health Check

Health Check

Health Check Name: * [>=5 Volumes Waiting for Flush]
Base Task: * [Volumes Waiting for Flush]
Priority: * [High]
Module Family: * [CPACS Back-End]
Module: * [Archive General]
Category: * [Archive]
Description: [Total amount of volumes Waiting for flush on site >=5]

Site Effect: *

Solving Steps: *
a. Log into the ESI/Archive Server
b. Log into the MMC
c. Check the Archive Network and the associated Store Manager for the correct number of volumes waiting for Responsible Team: * [T1]
KB Link:

Root Causes:

Source Data Type: * [Numeric]

── OK\Error Identification ──
Min OK Value: [0]        Min OK Value: [4]
Standard Priority Min Value: [ ]     Standard Priority Min Value: [ ]
High Priority Min Value: [ ]         High Priority Min Value: [ ]
Critical Priority Min Value: [ ]     Critical Priority Min Value: [ ]

☐ Disabled

Created on: 12/12/2010
Updated on: 12/12/2010

[Save]  [Exit]

FIG. 7B

Select last failure Health Checks

Location: (All)
Site: (All)
Site Priority: (All)
Category: (All)

Health Check: (All)
Priority: (All)
Results Severity: (All)

Version Category: (All)
Major Version: (All)
Version: (All)

Sorts
Sort by: Priority — Ascending
Then by: Results Severity — Ascending
Then by:
Then by:

☐ All

| Priority | Result Severity | Selected | Health Check | Site | Version | Result Date | Station Name | Station Type | Base Value |
|---|---|---|---|---|---|---|---|---|---|
| Critical | Critical | ☐ | >500 Unarch... | University of Pennsylvania H... | HC12.1_... | 11/29/2010 | cpacsdb | DB Server | 7278 |
| Critical | Critical | ☐ | >500 Unarch... | Taunton | HC12.1 | 11/29/2010 | MPH-CLTCS | DB Server | 3358 |
| Critical | Critical | ☐ | >500 Unarch... | CHA Hollywood MC... | HC12.1 | 12/07/2010 | hcimgsrv | DB Img Svr | 7571 |
| Critical | Critical | ☐ | >500 Unarch... | Dubois Regional | HC12.1 | 12/07/2010 | hcsqlsrv | DB Server | 3893 |
| Critical | High | ☐ | >500 Unarch... | IASIS FL | HC12.1 | 12/07/2010 | Hcimgsrv | DB Server | 4615 |
| Critical | High | ☐ | >24 Hours L... | CHI - St. Joseph MC Reading | HC12.1 | 10/06/2010 | Medcondb | DB Server | 132 |
| Critical | High | ☐ | >24 Hours L... | Metrol Health Medical Center | HC12.1 | 12/06/2010 | eairpcpacsd... | DB Server | 29 |
| Critical | Standard | ☐ | >24 Hours L... | Trinity - St. Marys Mercy | HC12.1 | 12/07/2010 | SWHCDB | DB Server | 696 |
| Critical | Standard | ☐ | >500 Unarch... | Memorial University Hospital | HC12.1 | 12/07/2010 | LIHSAPWH... | DB Server | 735 |
| Critical | Standard | ☐ | >500 Unarch... | Memorial University Hospital | HC12.1 | 10/20/2010 | MHCPACSDB | DB Server | 27.42 |
| Critical | Standard | ☐ | >25GB DB Lo... | CHI - St. Joseph MC Reading | HC12.1 | 10/20/2010 | MHCPACSDB | Gateway | 0 |
| Critical | Standard | ☐ | <3GB Server... | CHI - St. Joseph MC Reading | HC12.1 | 12/07/2010 | seletcpxns... | Hemo Stat.. | 0.82 |
| Critical | Standard | ☐ | <2GB Hemo... | Chilton Memorial Hospital | HC12.1 | 12/07/2010 | INFOSYST... | DB Server | 8.06 |
| Critical | Standard | ☐ | <10GB Free... | Chilton Memorial Hospital | HC12.1 | 12/07/2010 | MCDB1 | DB Server | 8.06 |
| Critical | Standard | ☐ | <25GB Free... | University of Pennsylvania H... | HC12.1 | 12/07/2010 | MCDB1 | DB Server | 7.62 |
| Critical | Standard | ☐ | <3GB Server... | University of Pennsylvania H... | HC12.1 | 11/29/2010 | cpacsdb | DB Server | 7.62 |
| Critical | Standard | ☐ | >500 Unarch... | CHI - St. Joseph MC Reading | HC12.1 | 11/29/2010 | cpacsdb | Gateway | 2.95 |
| Critical | Standard | ☐ | <10GB Free... | CHI - St. Joseph MC Reading | HC12.1 | 12/06/2010 | EAJRPCPAC... | DB Server | 15.91 |
| Critical | Standard | ☐ | >500 Unarch... | CHI - St. Joseph MC Reading | HC12.1 | 12/06/2010 | EAJRPCPAC... | Hemo Stat.. | 1.91 |
| Critical | Standard | ☐ | >500 Unarch... | Memorial Hospital at Gulfport | HC12.1 | 09/21/2010 | Infosystem0 | DB Server | 531 |
| Critical | Standard | ☐ | >500 Unarch... | CHI - St. Joseph MC Reading | HC12.1 | 12/07/2010 | cvis3cluster | DB Server | 2.37 |
| Critical | Standard | ☐ | >500 Unarch... | CHI - St. Joseph MC Reading | HC12.1 | 12/07/2010 | NWROSJC... | DB Server | 2.37 |

Health Checks Selected Count: 0 / 66

Open Case | Exit

METHODS, APPARATUSES, AND COMPUTER PROGRAM PRODUCTS FOR AUTOMATED REMOTE DATA COLLECTION

CROSS REFERENCE TO RELATED APPLICATION

This application claims priority to and is a nonprovisional application of U.S. Provisional Application No. 61/447,585, filed Feb. 28, 2011, which is incorporated by reference herein in its entirety.

FIELD

Embodiments of the present invention relate generally to collecting data from computing devices and, more particularly, relate to methods, apparatuses, computer program products and other means for receiving and analyzing data from remote devices.

BACKGROUND

Embodiments of the present invention are directed to enabling systems to remotely access networked devices. A number of deficiencies and problems associated with the use, upgrading and maintenance of remotely located devices have been identified. Through applied effort, ingenuity, and innovation, solutions to many of these identified problems have been solved by developing solutions that are included in the various embodiments of the present invention, some examples of which are detailed below.

BRIEF SUMMARY

Embodiments include systems, apparatuses, methods, computer readable media and other means for providing, among other things, a method of remote data collection by a central system, which may include, for example, the spider configuration server discussed herein. The method can comprise, for example, establishing a connection with a remote machine (such as the customer site machine referred to herein) and then transmitting an executable file to the remote machine over one or more networks. The executable file can be any suitable package of data that, in some embodiments, includes instructions to be executed by the remote machine. Once the executable file is operating on the remote machine, the remote machine can compile module data as a result of operating under the instructions included in the executable file. The module data can be related to the various modules (e.g., hardware, software and/or firmware modules) of the remote machine. The central system can pull the module data or otherwise initiate retrieval of the module data from the remote machine. In some embodiments, the central system's processor can generate usage information related to the remote machine based on the module data it pulls from the remote machine.

The central system can be configured to establish its initial and/or subsequent connections with the remote machine by first retrieving customer information from a customer relationship management server. The customer information may be stored in a networked database. The customer information can then be used to determine access information to establish a connection with the remote machine. In some embodiments, the remote machine can be located remotely from the customer relationship management server and communicate via one or more networks.

The processing of the module data can include generating usage information that includes how often the remote machine uses one or more modules loaded on the remote machine. As another example, the processing of the module data can include generating usage information that includes diagnostic data indicating whether the remote machine has experienced any technical problems. The diagnostic data can be used to determine at the central system one or more particular problems the remote machine has experienced. Then, without the remote machine requesting or, in some instances even knowing, it has experienced a technical problem, the central system can generate error correction data and transmit the error correction data to the remote machine to correct the particular problem.

In some embodiments, rather than or in addition to being configured to communicate with just one remote machine, the central system may be configured to communicate with a plurality of remote machines. These additional remote machines can be associated with the same or different customer(s), the same or different customer site(s), and/or any other identifying data. After establishing a connection with the plurality of additional remote machines, the central system can be configured to transmit the executable file to the additional remote machines and initiate retrieval of additional module data from the additional remote machines, wherein the additional module data is compiled by the additional remote machines operating under the instructions included in the executable file. The central system may then facilitate the processing the additional module data with the module data to generate additional usage information related to additional remote machines and the remote machine.

The additional usage information can comprise, for example, module usage information representing a number of the additional remote machines of a customer site that are using a particular module. In this manner, the central system can be configured to aid in determining how which modules are being heavily utilized and which modules are not. This information may be used to generate suggestion data relevant to the customer site's business. For example, if a module is being heavily utilized, an offer could be made for a bulk-use discount, whereas if a module is being underutilized, training could be offered as to how to better utilize the module.

When multiple remote machines are operating the executable file, the remote machines can be part of a mass deployment of software across one or more customer sites. As another example, the remote machines' module data can be used to facilitate a global benchmarking system. As yet another example, the additional module data can comprise implementing an error policy including provisions for correcting an error on one of the additional remote machines that has not experienced an error after determining another of the additional remote machines has experienced the error.

As such, some embodiments discussed herein can include a system comprising processor configured to: establish a connection with a remote machine; transmit an executable file to the remote machine, wherein the executable file includes instructions to be executed by the remote machine; initiate retrieval of module data from the remote machine, wherein the module data was compiled by the remote machine operating under the instructions included in the executable file; and process the module data to generate usage information related to the remote machine.

As another example, some embodiments can include a computer program product for conducting remote data collection, the computer program product comprising at least one non-transitory computer-readable storage medium having computer-executable program code instructions stored therein, the computer-executable program code instructions comprising: program code instructions for executing any method or step of method discussed herein, including establishing a connection with a remote machine; program code instructions for transmitting an executable file to the remote machine, wherein the executable file includes instructions to be executed by the remote machine; program code instructions for initiating retrieval of module data from the remote machine, wherein the module data is compiled by the remote machine operating under the instructions included in the executable file; and program code instructions for processing the module data to generate usage information related to the remote machine.

BRIEF DESCRIPTION OF THE DRAWING(S)

Reference will now be made to the accompanying drawings, which are not necessarily drawn to scale, and wherein:

FIG. 4 shows an exemplary configuration task file in XML format in accordance with some embodiments discussed herein;

FIG. 5 shows an exemplary results file in XML format in accordance with some embodiments discussed herein;

FIGS. 7A-C show exemplary displays that may be presented to a user according to some embodiments of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
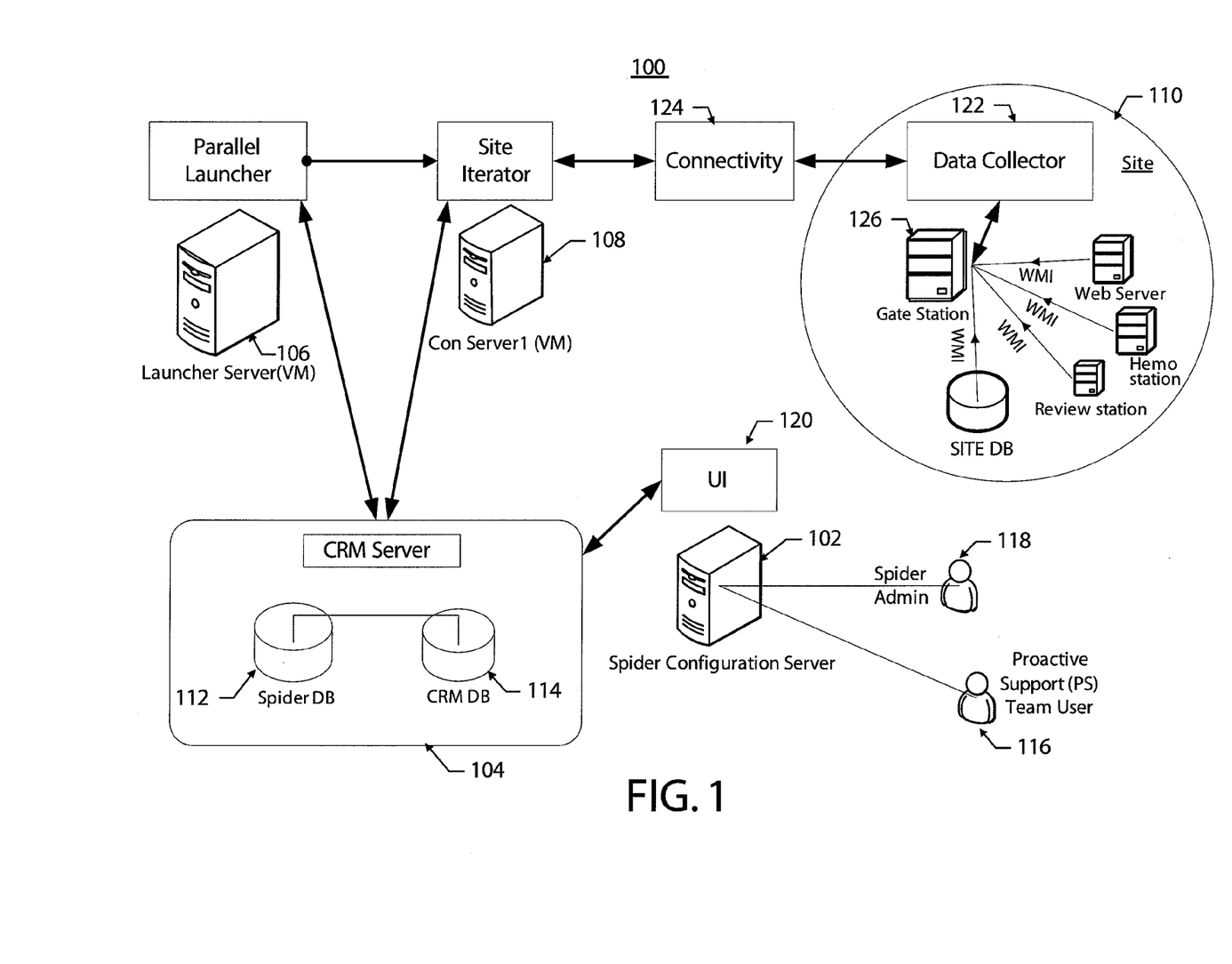
FIG. 1 shows an exemplary system, which includes various servers and other types of networked machines according to some embodiments of the present invention.

FIG. 1 shows system 100, which includes various servers and other types of networked machines. For example, system 100 may include spider configuration server 102, customer relationship management server 104, launch server 106, console server 108 and customer site machines 110.

System 100 may be configured to provide an infrastructure that enables one or more devices, such as spider configuration server 102 and customer relationship management server 104, to automatically connect, using one or more networks and network protocols, to one or more remote machines, such as one or more of customer site machines 110. System 100 may be configured to use the remote connections to, for example, provide proactive support monitoring by running scripts (such as, e.g., diagnostic tests) and/or collecting data (such as diagnostic test result data) from one or more customer site machines 110. Each data collection process can be initiated to run nightly and/or on a more or less frequent basis.

The collected data can be received at a centralized location, such as at spider database 112, which is shown in FIG. 1 as being memory included in and/or directly connected to customer relationship management server 104 with customer relationship management database 114. In other embodiments, spider database 112, for example, may be included in spider configuration server 102 and/or located at any other suitable location. The collected data can be analyzed by one or more other machines (not shown) and/or otherwise used by support team 116. Any problems discovered from the diagnostic test results data may then be fixed by support team 116 and one or more customer site machines 110 may or may not be notified of the problems before or after the problems have been fixed. For example, if diagnostic tests are run at night and a problem is identified, the problem can be fixed before the customer returns to work to use the customer site machine in the morning and, in some instances, before the customer has even realized there was a problem or experienced the symptoms of the problem.

System 100 may also be configured to perform fact-based decision making. For example, spider configuration server 102 can be configured to retrieve (e.g., pull) data from one or more customer site machines 110 that were installed and/or maintained by a particular organization. System 100 can then be configured to use the retrieved data to improve the organization's technical and/or business decision making process. In some embodiments, for example, the same organization that operates the customer site machines 110 may also own, maintain or otherwise operate spider configuration server 102 and/or other aspects of system 100. In some embodiments, the organization may pay the operator of spider configuration server 102 to use the services of system 100, some examples of which (e.g., data collection, diagnostic testing, technical support, among others) are discussed herein.

The various types of decisions, including technical and business decisions, can be made by any part of the company or other organization using the information generated and/or retrieved by spider configuration server 102 and/or other components of system 100. For example, if the organization knows how many of customer site machines 110 are using a module installed thereon and/or the relative frequency of use of a module, system 100 and/or the people operating system 100 can use this information to formulate suggestions for improving their business and/or their customer's business. For instance, if only a small amount of customer site machines 110 (e.g., 5% or some amount below a predetermined minimum threshold) are actively using a particular module that is installed on all customer site machines 110, then system 100 can be configured to suggest conducting an investigation as to why this module has been unsuccessful and/or is otherwise being under utilized. As another example, if a large amount of customer site machines 110 (e.g., 90% or some amount above a predetermined maximum threshold) are using the module installed on customer site machines 110, then the organization can decide to continue to check the use of other modules and/or conduct an investigation as to why this particular module is so well utilized. In addition to use by particular machines, system 100 may also be configured to determine how many people are using a module (based on, e.g., their sign in credentials) and use this information similar to or the same as information associated with customer site machines 110. The utilization of a module may also be used when determining the price for various modules in the future. As another example, module utilization can be used to determine where to focus searches, fix technical faults and/or find other errors that may be occurring on customer site machines 110.

Spider configuration server 102 can also be configured to enable the creation of tools that support connecting to machines at various sites, such as customer site machines 110, and/or synchronization the data of machines across sites into, for example, customer relationship management server 104 and/or customer relationship management database 114. In addition or alternatively, spider configuration server 102 can be configured to aid in and/or otherwise conduct the mass deployment of software to many customer machines across customer sites in the same transaction (e.g., simultaneously, near-simultaneously and/or sequentially). Spider configuration server 102 may also be used to facilitate one or more types of global benchmarking systems, at least some of which can be configured to operate without requiring customer or other types of target machines to upload information on a regular basis.

Additionally spider configuration server 102 and/or other components of system 100 can be used to monitor for copyright infringement and/or other impermissible use of an enterprise's computer systems. As another example, spider configuration server 102 and/or other components of system 100 can be configured to determine which customer machines need to be updated and deploy the necessary software updates, including bug fixes.

Spider administrator 118 may use user interface application 120 and/or user interface hardware to configure spider configuration server 102 and the functionality provided by it. Some additional examples of circuitry and other hardware, including user interface hardware, that may be included in spider configuration server 102 are discussed below in connection with, e.g., FIG. 6. The functionality that spider configuration server 102 performs within system 100 can at least partially be based on the ability of spider configuration server 102 to generate an executable file or other type of task file that runs on one or more registered machines of customer site machines 110. Each task file may include one or more tasks and/or other types of instructions to be executed by one or more customer site machines 110. For example, if the task file includes data collection instructions, the customer machine's processor can be configured, at least temporarily, to function as data collector 122. The executable file can also or instead be configured to cause one or more of customer site machines 110 to generate a configuration file in any format, such as the extensible markup language ("XML") format. An example of a configuration file in XML is discussed below in connection with, e.g., FIG. 4. As another example, the executable file may instead or additionally include instructions for performing health check tasks that comprise instructions for running diagnostic tests on one or more of customer site machines 110. In some embodiments, the file generated by spider configuration server 102 for one or more customer site machines 110 can be limited to read only structured query language ("SQL") queries and/or windows management instruction ("WMI") actions to protect and/or otherwise reduce the chance of causing harm to one or more of customer site machines 110.

In some embodiments, spider configuration server 102 can provide the same file to all of customer site machines 110 that are registered for execution. In this regard, spider configuration server 102 can instruct a subset of customer site machines 110 that are associated with an account (e.g., have paid for and/or are otherwise configured to receive the services provided by spider configuration server 102) and/or other type of group to perform certain tasks. Spider configuration server 102 can also or instead be configured to define one or more tasks and/or generate an executable file that is relevant for specific customer site(s) and/or customer machine(s).

Customer relationship management server 104 can aid in spider configuration server 102's ability to access one or more customer site machines 110. In some embodiments, customer relationship management server 104 and spider configuration server 102 are incorporated into the same physical machine, such as the apparatus discussed in connection with, e.g., FIGS. 2 and 6. In other embodiments, customer relationship management server 104 and spider configuration server 102 are distributed among two or more machines, such as that shown in FIG. 1. Customer relationship management server 104 may include and/or otherwise access a customer relationship management application, and/or the like comprising one or more data records. Exemplary data included in the data records may include user names, passwords, service history and/or any other customer information that may be associated with customer site machines 110 and/or needed by spider configuration server 102 to access customer site machines 110. (As used herein, "exemplary" means serving as an example, instance or illustration.) The data set served by customer relationship management server 104 may comprise a plurality of data fields, which is similar to or the same as the other servers and memory devices discussed herein. Data that comprises a data record may be contained within the data fields. The data fields can categorize the data contained within them. In this regard, data fields for a data set may be specified in accordance with a database format, in the first row of a data table or spreadsheet, or the like and stored in customer relationship management database 114. Although FIG. 1 shows only one customer relationship management server 104, system 100 can be configured to accommodate multiple enterprises and/or servers, including multiple customer relationship management servers. In addition to adding components to some embodiments, various components may be removed and/or combined without departing from the spirit of the invention.

In some embodiments, spider configuration server 102 can be configured to use customer relationship management server 104 to connect to one or more of customer site machines 110 by initiating the connection to one or more of customer site machines 110. Once the connection is made, the spider configuration server 102 may be granted machine-specific, site-specific and/or any other suitable permissions to install the executable file or other type of file that configures (e.g., provides instructions that can be run by) one or more of customer site machines 110 to function as data collector 122. For example, the executable file may include instructions for creating a web or other type of crawler, which crawls among customer site machines 110 and causes one or more of customer site machines 110 to function as data collector 122.

As discussed below, data collector 122 can generate a resulting XML file and/or other type of results file that can be pulled back (e.g., retrieved, copied, etc.) by spider configuration server 102 and/or any other component(s) of system 100. An exemplary results file in XML format is shown in FIG. 5. In some embodiments, the results file can instead or additionally be pushed back by data collector 122 and/or any other of customer site machines 110. The results file can then be saved in, for example, spider database 112, analyzed by one or more machines of proactive support team 116 and/or otherwise processed. In some embodiments, evidence of the data collection instructions and/or other aspects of the task file will leave no footprint and/or other trace at customer site machines 110 after the data collection has been completed and results file has been pulled back or otherwise received by the spider configuration server 102 and/or spider database 112.

One or more validation procedures and/or other confirmatory tests may also be performed by spider configuration server 102 to determine whether or not data collector 122 is up-to-date or in need of an updated set of tasks or other instructions. In some embodiments, for example, before data collector 122 collects data on nightly basis (or any another predetermined schedule) and/or at any other time, spider configuration server 102 can check a version identifier associated with data collector 122's executable file and/or any other information associated with data collector 122 (such as a configuration file installed thereon), and determine whether or not data collector 122 needs to be updated before it collects data from customer machines 110.

In some embodiments, system 100 can be configured to analyze diagnostic test results regardless of the type of customer site machines 110. Also, while the diagnostic test results may be analyzed remotely from customer site machines 110, in some embodiments the analysis of the diagnostic test results and/or other features provided by system 100 may be implemented by customer site machines 110. For example, a separate service may be provided as part of a dynamic linked library ("DLL") that may enable enhanced interpretation of task results that are in special formats in addition to or instead of strings and/or numerics.

In this regard, some embodiments of the present invention enables spider configuration server 102 to automatically connect to customer site machines 110 and pull information from customer site machines 110 without having to perform special installations of agents. Each of customer site machines 110 may be required to preregister to one or more of the services provided by spider configuration server 102 and/or other aspects of system 100 before, e.g., spider configuration server 102 can connect thereto.

Various components of system 100 can be used to connect spider configuration server 102 to one or more customer site machines 110. For example, launch server 106 and console server 108 can be included in a private network (such as a corporate intranet), public network (such as the Internet) and/or any other type of network. Launch server 106 can include instructions stored thereon that allow it to function as a parallel launcher component, which retrieves a list of one or more specific (e.g., registered) customer sites and launches tasks one or more of the listed (or otherwise identified) customer sites in parallel (e.g., simultaneously or near-simultaneously). Console server 108 can include instructions stored thereon that allow it to function as a site iterator that uses, for example, a connectivity component, such as connectivity component 124, to deploy data collector 122 and its configuration file to a gate station, such as gate station 126, at the customer's site. Gate station 126 may be one of the customer site machines 110 that is determined to be the least or one of the least mission critical machines of customer site machines 110. In this regard, if a problem, such as a central processing unit freezes or gets slowed down, the problem would not harm the site or at least have minimal negative impact. Console server 108 may also include instructions that causes data collector 124 to run on gate station 126. Console server 108 may also be configured by stored instructions to wait until the data collection process and/or other tasks executed by data collector 124 ends.

Figure 2:
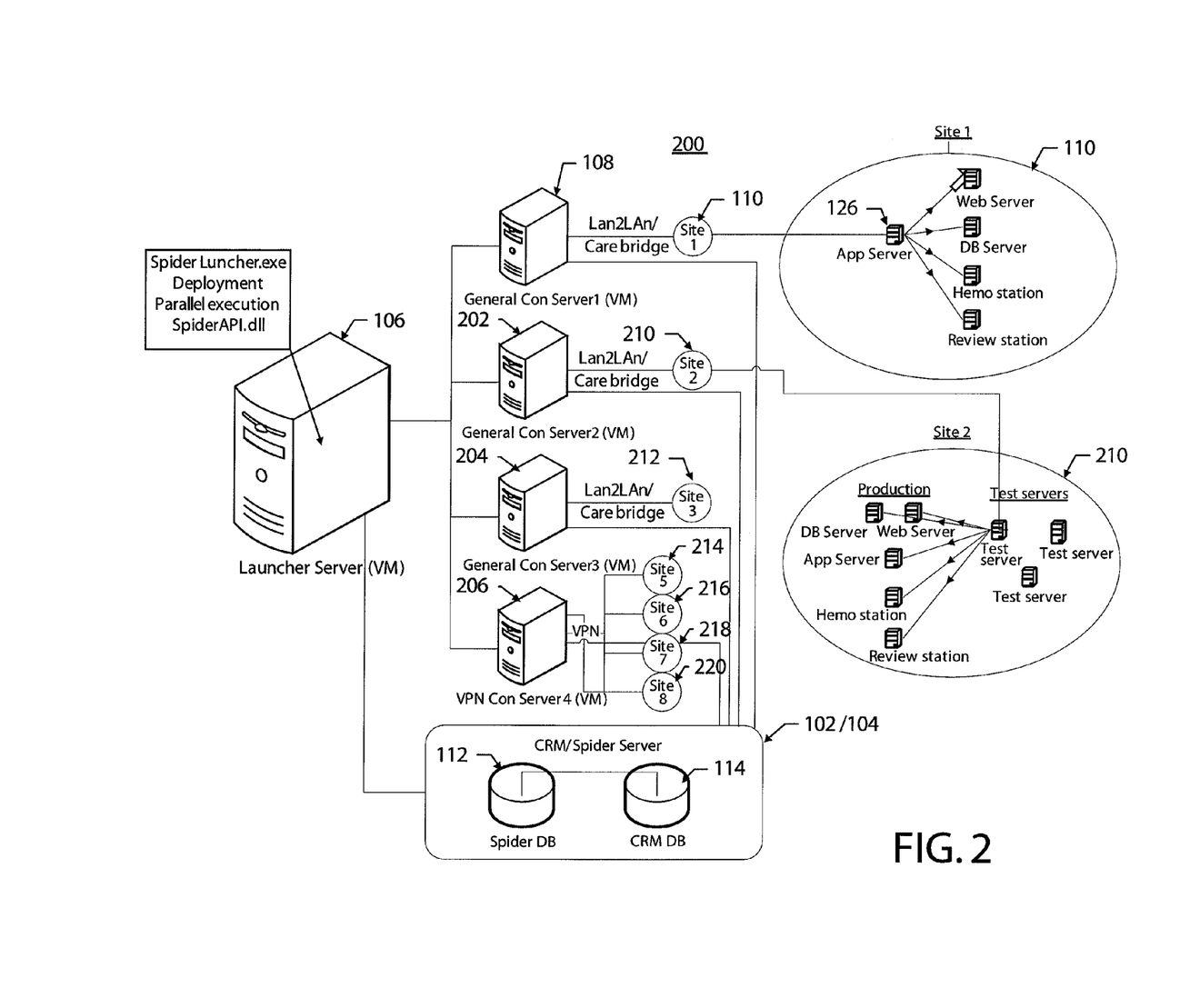
FIG. 2 shows another exemplary system of networked machines according to some embodiments of the present invention.

FIG. 2 shows an example of system 200 in accordance with some embodiments of the present invention where spider configuration server 102 and customer relationship management server 104 are combined into a single machine. System 200 also includes launch server 106, console server 108 and console servers 202, 204 and 206. Console server 108, as discussed in connection with FIG. 1, interfaces with customer site machines 110. Console server 202 is a second general console server that is configured to service customer machines at a different site, namely customer site machines 210. Similarly, console server 204 is a third general console server that is configured to service customer site machines 212 located at a third customer site. As referenced herein, a customer site may include an enterprise (such as a hospital or other business organization), a department or group within an enterprise (such as cardiology), room or other area of a building and/or any other type of physical location that includes networked machines. In this regard, the customer sites shown in FIG. 2 may be spread among one or more buildings, cities, states, countries, and/or any other type of location.

Console servers 108, 202 and 204 may connect to one or more site machines using a connectivity component, such as connectivity component 124 of FIG. 1, comprising any type of connection protocol and/or hardware, such as those that enable a care bridge and/or local area network ("LAN") to LAN ("LAN2LAN") connection. For example, a Symantec pcAnywhere offers an exemplary care bridge solution and Cisco Systems offers an exemplary LAN2LAN solution.

To utilize a care bridge connectivity component, for example, console server 108 can start an authentication process and an access description process. Console server 108 can then initiate the PCAnywhereWrapper connection setting object and initiate the PCAnywhereWrapper Engine. Console server 108 can also be configured to copy executable instructions for creating a data collector and configuration file onto gate station 126 using the PCAnywhereWrapper engine object. An exemplary configuration file in XML is shown in FIG. 4. Console server 108 may then send a command using the PCAnywhereWrapper engine object that causes gate station 126 to function as data collector 122 discussed above. Console server 108 may then copy the results file from gate station 126 using the PCAnywhereWrapper Engine object. An exemplary XML results file is shown in FIG. 5. Console server 108 may then be configured to disconnect the authentication process and disconnect the access description process.

As another example, to utilize a LAN2LAN connectivity component, console server 108 can be configured to initiate the PCAnywhereWrapper Engine and then copy a data collector executable file onto gate station 126 using the PCAnywhereWrapper Engine object. After the executable file is installed onto gate station 126, console server 108 can cause the execution of the data collector 122 by gate station 126, using the PCAnywhereWrapper Engine object. Console server 108 may then pull back the resulting file (such as that shown in FIG. 5) by copying it from gate station 126 using the PCAnywhereWrapper Engine object.

While console servers 108, 202 and 204 are shown in FIG. 2 as general console servers using a care bridge or LAN2LAN to connect to customer site machines at a single customer site, console server 206 is shown in FIG. 2 as a virtual private network ("VPN") console server that can connect using VPN protocols and hardware to customer site machines at a variety of sites, namely sites 214, 216, 218 and 220. Console server 206 may also be configured to allow remote devices, such as a laptop computer of spider administrators (such as spider administrator 118), to access system 200.

To utilize a VPN connectivity component, console server 108 can, for example, be configured to start a VPN client executable using a profile configuration file ("PCF") file. Console server 108 may also be configured to initiate the PCAnywhereWrapper connection setting object and initiate the PCAnywhereWrapper Engine. As discussed above, the data collector executable file can be copied to gate station 126 using the PCAnywhereWrapper Engine object. Operation of data collector 122 on gate station 126 can be triggered remotely using the PCAnywhereWrapper Engine object, and the resulting file can be copied from gate station 126 using the PCAnywhereWrapper Engine object. System 200 may then disconnect the VPN Client executable file. Although various pcAnywhere and Cisco Systems components are used as examples above, one skilled in the art would appreciate that any suitable component may be used as the connectivity component.

Figure 3:
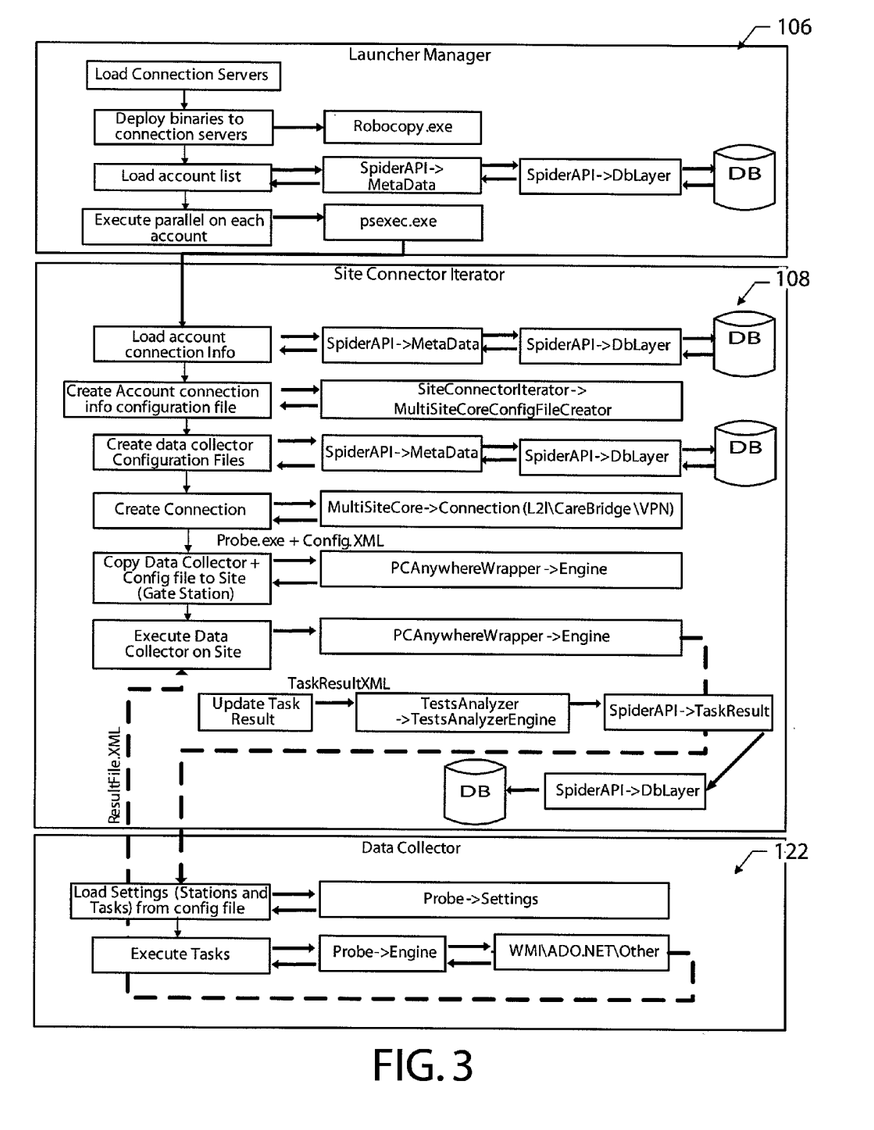
FIG. 3 shows an exemplary logical process flow diagram of instructions that may be stored and sequentially executed by various components of systems according to some embodiments of the present invention.

FIG. 3 shows a logical process flow diagram of instructions that may be stored and executed by various components of systems 100 and 200. For example, launch server 106, console server 108, data collector 122 and one or more databases or other storage devices can execute the various instructions and other functions shown in FIG. 3 in a temporal order (such as that suggested by the arrows of FIG. 3).

FIG. 4 shows configuration task file 400 in XML format in accordance with some embodiments discussed herein. Configuration task file 400 can be used to configure a data collector, such as data collector 122, at a customer site machine, such as gate station 126. For example, gate station 126 may include non-transitory storage medium, such as that discussed in connection with FIG. 6 below, that is configured to store configuration task file 400 and a processor configured to execute configuration task file 400. The configuration task file can be used to configure and execute diagnostic tests, a machine crawler that crawls various customer site machines, a module use survey and/or any other functionality. Configuration task file 400 may also cause data collector 122 to generate, store and/or transmit a results file, such as that shown in FIG. 5.

FIG. 5 shows results file 500 in XML format in accordance with some embodiments discussed herein. Results file can be copied by a remote device, such as spider configuration server 102, and/or stored by a database, such as spider database 112, for subsequent analysis, sale, processing, among other things. For example, results file 500 can include information about errors experienced by one or more customer site machines, such as customer site machines 110 of FIG. 1.

Figure 6:
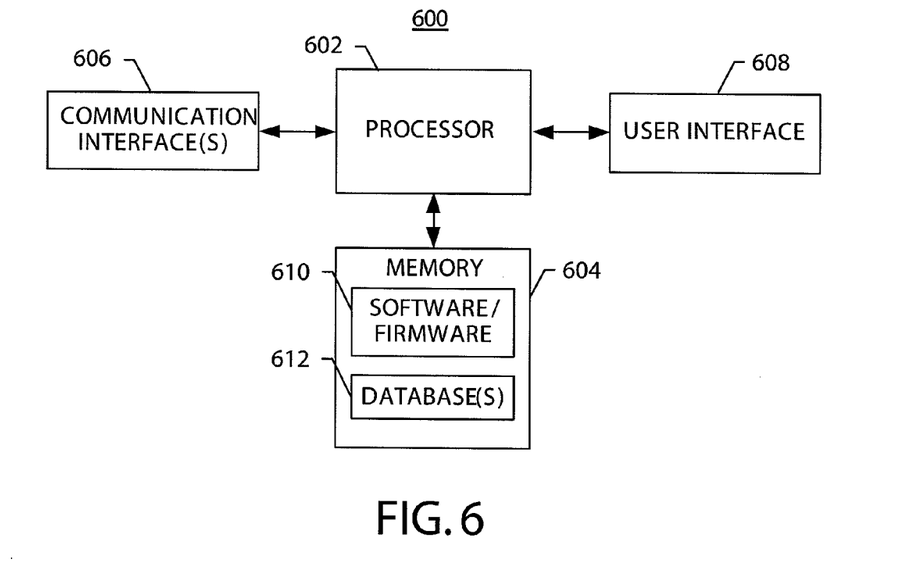
FIG. 6 shows a block diagram of an apparatus according to some embodiments of the present invention.

FIG. 6 shows a block diagram of apparatus 600, which comprises circuitry and other hardware that may be included in one or more components of systems 100 and 200. For example, the components of apparatus 600 may be included in spider configuration server 102, customer relationship management server 104, launch server 106, console server 108, customer site machines 110 and/or any other machine(s) included in systems 100 and 200.

As such, apparatus 600 may be embodied as a server, desktop computer, laptop computer, mobile terminal, mobile computer, mobile phone, mobile communication device, audio/video player, television device, network node, multiple computing devices in communication with each other, any combination thereof, and/or the like. FIG. 6 shows one example embodiment of apparatus 600. As illustrated in FIG. 6, in accordance with some exemplary embodiments, apparatus 600 includes various means, such as processor 602, memory 604, communication interface 606 and user interface 608 for performing the various functions herein described. These means of apparatus 600 as described herein may be embodied as, for example, circuitry, hardware elements (e.g., a suitably programmed processor, combinational logic circuit, and/or the like), a computer program product comprising computer-readable program instructions (e.g., software/firmware 410) stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 602 comprises a plurality of processors. The plurality of processors may be embodied on a single computing device or may be distributed across a plurality of computing devices collectively configured to function as apparatus 600. The plurality of processors may be in operative communication with each other and may be collectively configured to perform one or more functionalities of apparatus 600 as described herein. In an example embodiment, processor 602 is configured to execute instructions stored in memory 604 or otherwise accessible to processor 602. These instructions, when executed by processor 602, may cause apparatus 600 to perform one or more of the functionalities of apparatus 600 as described herein. As such, whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein.

Memory 604 may comprise, for example, volatile, non-volatile memory, or some combination thereof. Although illustrated in FIG. 6 as a single memory, memory 604 may comprise a plurality of memories. The plurality of memories may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data, applications, instructions, or the like for enabling apparatus 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by apparatus 600 during the course of performing its functionalities.

Communication interface 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second apparatus 600 and/or the like. In at least one embodiment, communication interface 606 is at least partially embodied as or otherwise controlled by processor 602. In this regard, communication interface 606 may be in communication with processor 602, such as via a bus. Communication interface 606 may include, for example, an antenna, a transmitter, a receiver, a transceiver, network interface card and/or supporting hardware and/or firmware/software for enabling communications with another computing device. Communication interface 606 may be configured to receive and/or transmit data using any protocol that may be used for communications between computing devices. Communication interface 606 may additionally be in communication with the memory 604, user interface 608 and/or any other component of apparatus 600, such as via a bus.

User interface 608 may be in communication with processor 602 to receive an indication of a user input and/or to provide an audible, visual, mechanical, or other output to a user. As such, user interface 608 may include, for example, a keyboard, a mouse, a joystick, a display, a touch screen display, a microphone, a speaker, and/or other input/output mechanisms. In embodiments wherein apparatus 600 is embodied as a server, aspects of user interface 608 may be reduced as compared to embodiments where apparatus 600 is user terminal or customer device. In some embodiments, user interface 608 may even be eliminated. Alternatively, such as in embodiments wherein apparatus 600 is embodied as a server, at least some aspects of user interface 608 may be embodied on an apparatus used by a user that is in communication with apparatus 600, such as for example, spider administrator device 118. User interface 608 may be in communication with the memory 604, communication interface 606, and/or any other component(s), such as via a bus.

Figure 7A:
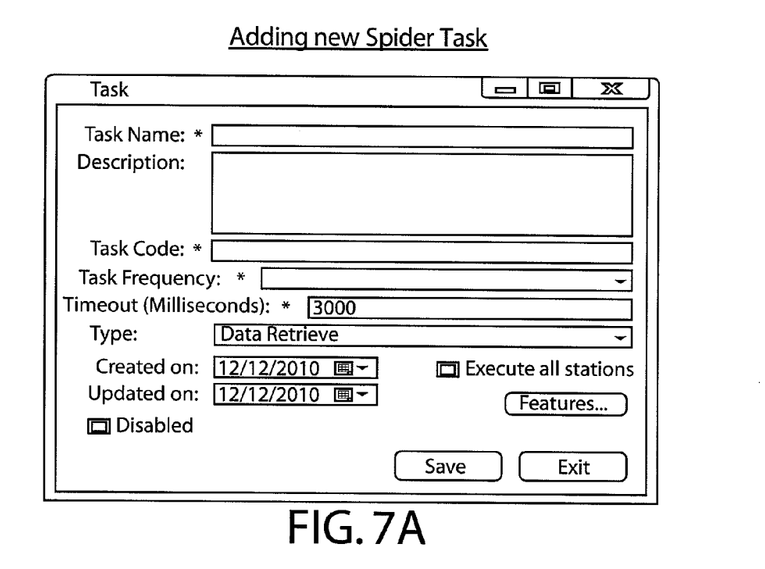
Figure 7B:
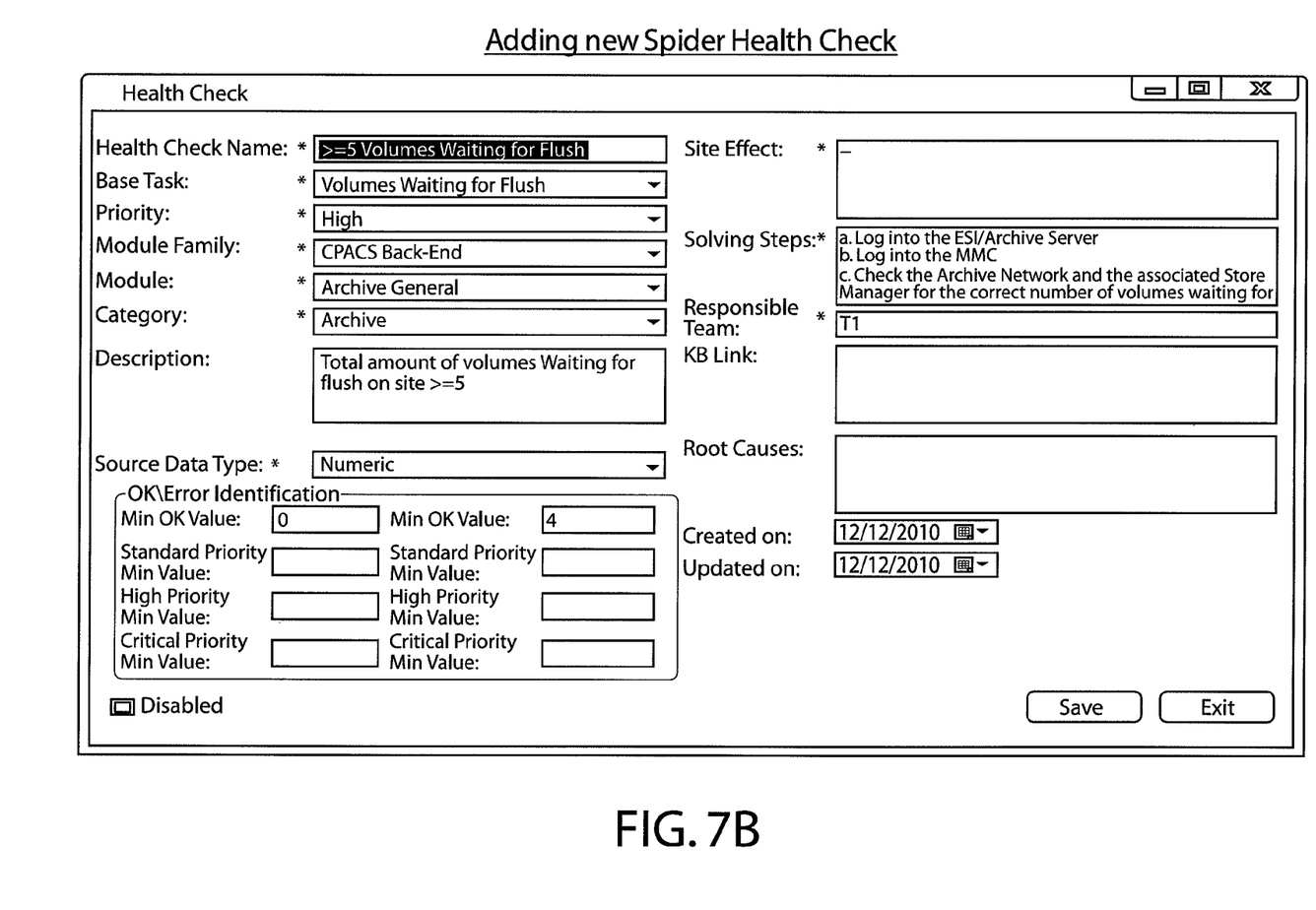

FIGS. 7A-7C show exemplary displays that may be presented by user interface 608 in accordance with some embodiments of the present invention. FIG. 7A shows an exemplary display window that may be used by, e.g., spider administrator 118 to add a new task when creating an executable file that will provide the instructions for the data collector. FIG. 7B shows an exemplary display window that may be used by, e.g., spider administrator 118 to create an executable machine which will cause a customer machine to run diagnostic tests for a system health check. FIG. 7C shows an exemplary display window that may be used by, e.g., spider administrator 118 to select and/or review one or more results files of failure health checks, such as that shown in FIG. 5.

Systems in accordance with some embodiments discussed herein may be configured to implement an error policy. The error policy may include provisions for the data collector, such as data collector 122, experiencing a fault. For example, data collector error handling can be implemented in a main tasks executer loop function, which allows one or more (including every) task failure to be handled in one place. The execute loop function return status info and error message for each task, and can be written into task result XML file, such as that discussed in connection with FIG. 5.

The error policy may also include provisions for handling site iterator errors, such as those that may occur at console server 108. For example, when an account execution fails (on one or more levels), an error can be logged and the process continues to next site. Each result file can be analyzed. If a general error occurs that may affect a main function that was not handled in account executer function, an error message is logged and function returns an exit code.

The error policy may also include provisions for handling errors experienced by a parallel launcher, such as that implemented by launch server 106. This type of error handling may be implemented in a main process function. Each error (on any level) can be logged.

The system may also be configured with provisions for when an error occurs with connectivity module 124. Connectivity error handling can be implemented in a main process function. Each error (on any level) can be logged.

Some embodiments may also implement various security measures to mitigate any potential harm that may be caused to the customer machines and/or any other components of the systems discussed herein caused by spider configuration server activity, among other things. For example, to mitigate negatively impacting a customer machine's normal activity, spider configuration server may install data collectors that run in read-only mode. In healthcare systems, this may help insure no harm is done to patient data and/or healthcare equipment configurations at the customer's site. Below is Table 1 showing other potential risks and associated mitigation measures that may be implemented by some embodiments discussed herein.

TABLE 1

| Example Risk | Example Mitigation Measures |
| --- | --- |
| Altering of data on site that could be caused by human error or malicious intention | Connection to SQL can be done only using a read-only user that can be automatically generated by Spider server |
| Query locks the database and causes system not to function or to function slowly | Queries should run with no-lock mode and also connection to database should be in no-lock mode |
| Query/Action loads the system/database | Each task can have a timeout and this can be configured to limit the time the task run whether it is database or not |
| Specific tasks loads the site and affects site activity | Can run Task Duration Report and analyze its statistics. |
| Spider Activity loads the site and affects site activity | Can run Account Session Duration Report and analyze its statistics. |
| Spider Activity loads the site and affects site activity | Upon insertion of a new task, the frequency (Single, Daily, Weekly or Monthly) can be determined |
| Malicious Use of Spider Engine | Can create a Spider Branch with limited Permissions for Spider Administrators only |
| Malicious Use of Spider Engine | Spider Engine can run using login only of one of the Spider's Administrators |
| DataCollection action causes machine to be stuck (The machine that was used for connection) | Spider can be configured to connect to the least mission critical machine on the site |
| Customer does not want Spider service/Proactive Support Monitoring to be activated | T1 can notify the customer about the proactive support new service using the customer facing document. In case the customer agrees for the new service, it can be marked by T1 representative in CRM under Remote Connection tab by checking the option "Allow Proactive Automatic Connection" = Yes |
| Upon Spider run, DataCollector.exe could be maliciously substituted with a file with bad effect. | File can be automatically checked out from our Source Control System (TFS) that can protected by the relevant permissions |

Figure 8:
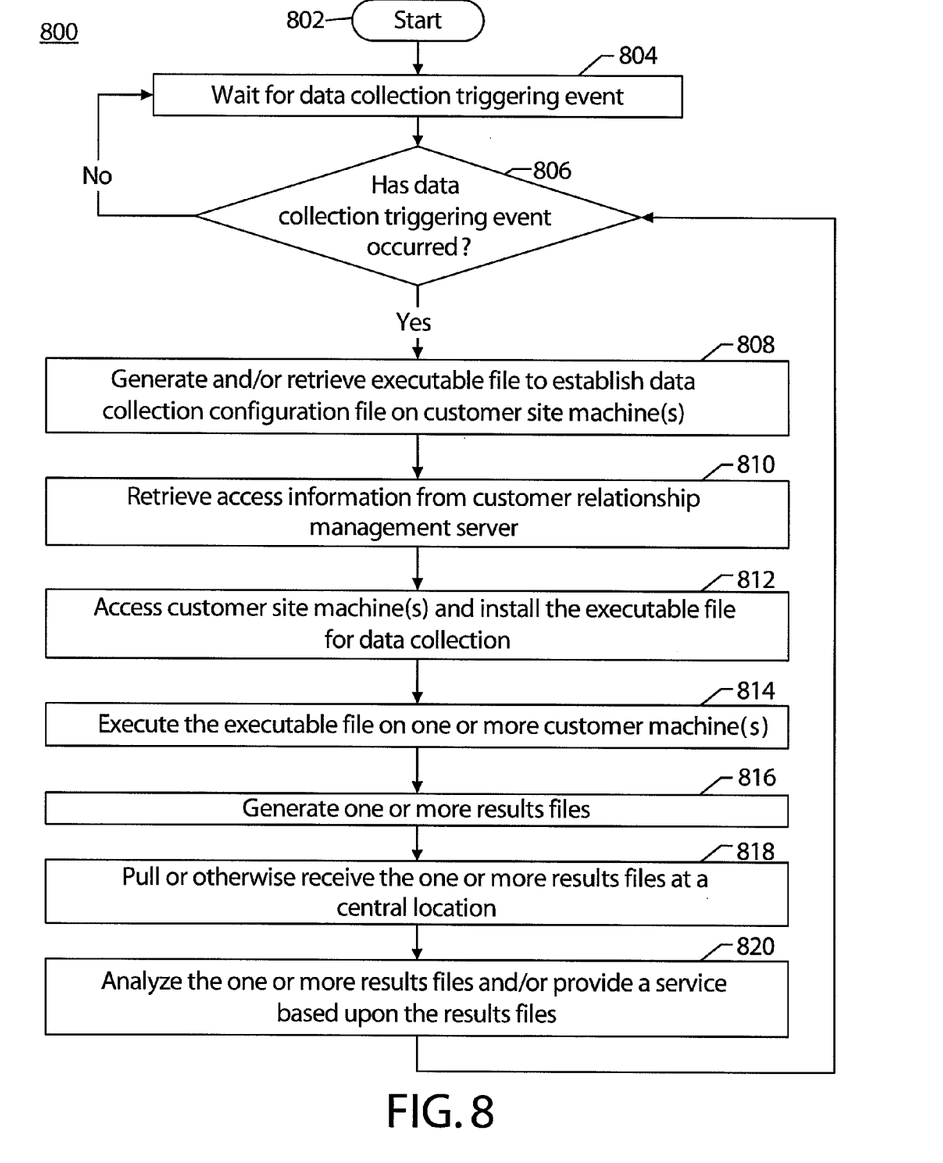
FIG. 8 shows an exemplary logical process flow diagram that may be executed by various components of systems according to some embodiments of the present invention.

FIG. 8 shows process 800, which may be used in accordance with some embodiments to collect and/or use data at a central device, the data being collected from one or more remote devices. Like some other processes discussed herein, process 800 is represented by a flow diagram in accordance with some exemplary methods, computer program products and/or systems discussed herein, including systems 100 and 200. It will be understood that each operation, action, step and/or other types of functions shown in the diagram, and/or combinations of functions in the diagrams, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein. For example, program code instructions associated with FIG. 8 may be stored on one or more storage devices, such as memory 608, and executed by one or more processors, such as processor 602. Additionally or alternatively, one or more of the program code instructions discussed herein may be stored and/or performed by distributed components, such as those discussed in connection with systems 100 and 200. As will be appreciated, any such program code instructions may be loaded onto computers, processors, other programmable apparatuses (e.g., apparatus 600) or network thereof from one or more computer-readable storage mediums (e.g., spider database 112) to produce a particular machine, such that the particular machine becomes a means for implementing the functions of the actions discussed in connection with, e.g., FIG. 8 and/or the other drawings discussed herein. As such, FIG. 3 showing data flows may likewise represent program code instructions that may be loaded onto a computer, processor, other programmable apparatus or network thereof to produce a particular machine.

The program code instructions stored on the programmable apparatus may also be stored in a non-transitory computer-readable storage medium that can direct a computer, a processor (such as processor 602) and/or other programmable apparatus to function in a particular manner to thereby generate a particular article of manufacture. The article of manufacture becomes a means for implementing the functions of the actions discussed in connection with, e.g., FIG. 8 and the other flow chart included herein. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., process 800 of FIG. 8.

Process 800 starts at 802. At 804, one or more processors and/or other components can be configured wait for a data collection triggering event. For example, a processor and/or other circuitry of spider configuration server 102 of FIG. 1 may wait at 804 until a predetermined time (e.g., midnight), communications signal (from, e.g., a customer site machine), and/or any other criteria is satisfied (e.g., the least mission-critical customer site machine is available to conduct data collection, customer relationship management server 104 is available to provide access information, among other things).

At 806, a determination can be made by the system whether or not a data collection triggering event has occurred. In response to determining a data collection triggering event has not occurred, process 800 returns to 804 and the system continues to wait. In response to determining at 806 that a data collection triggering event has occurred, process 800 advances to 808.

At 808, the system can be configured to generate and/or retrieve one or more executable files to establish one or more data collection configuration files at one or more customer site machines. For example, a user may use displays, such as those shown in FIGS. 7A and 7B to identify a series of tasks to be performed by a remote device. The system may use the information provided by the user to generate (e.g., at 808) an executable file to run the tasks on one or more remote machines. If the executable file was generated previously, the system can retrieve the executable file from memory at 808. The executable file can be machine-specific, site-specific and or general to all machines (e.g., all machines that are registered, all machines that are of a certain type, all machines that are networked, etc.).

At 810, access information (such as Internet protocol addresses, user names, passwords, required protocols, and/or other information needed to access one or more customer machines) can be retrieved from a customer relationship management server (e.g., customer relationship management server 104), customer relationship management database (e.g., customer relationship management database 114) and/or any other device. In some embodiments, one or more of the steps and/or functions discussed herein may be omitted, combined, modified and/or executed in a different order. For example, the functions of 810 can be omitted in embodiments that do not utilize a customer relationship management server and/or do not need to satisfy security protocols each time process 800 is executed.

At 812, one or more components of system 100, such as a spider configuration server, can use the access information obtained at 810 to access one or more customer site machines. To access the customer machine(s), one or more connectivity components (such as those discussed in connection with FIG. 2) can be utilized at 812. The executable file from 808 can also be installed at 812 on the one or more customer site machines.

Upon being installed, the executable file can be executed at 814 by the customer machine(s). For example, the executable file can cause the customer machine can generate a configuration file, such as that shown in FIG. 4, and be configured to function as a data collector. The executable file may cause the customer machine to collect data locally thereto and/or function as a network crawler and collect data from other customer machines. In collecting data from other network machines, the data collector may pass the executable file received from the spider configuration server onto other machines and create a daisy-chain of data collectors.

In some embodiments, 814 may follow 806. For example, the executable file may have been previously installed onto one or more customer machines. In such embodiments, the spider configuration server can be configured to trigger the execution of the executable file, confirm the previously-installed execution file is up-to-date, among other things. The executable file may also or instead include a self-trigger mechanism (e.g., based on the time of day, utilization of the machine, among other things).

At 816, one or more results files, such as that shown in FIG. 5, can be generated by the data collector(s). The results files can include, for example, the data collected by the one or more data collectors. Some examples of the types of data that can be collected are discussed above, including module utilization data, error log data, system configuration data, user-related information, among other things.

At 818, a central system, such as spider configuration server 102, can be configured to pull and/or otherwise receive (e.g., one or more customer machines may be configured to push) the one or more results files. The information from the results file can be saved in a database (such as spider database 112) and/or any other device.

At 820, one or more machines can be configured to analyze the information of the one or more results files and/or provide a service based upon the results files. For example, a report may be generated and sold based on the results files. As another example, the operator of the spider configuration server can determine the relative success of one or more products they have sold to the customer. Process 800 may then advance back to 806.

In some embodiments, one or more functions discussed herein may be run in parallel. For example, 820 may take hours, days, weeks or any other period of time to be executed, and the rest of process 800 may only take minutes or hours. As such, the functions of 820 may be executed based on one or more sets of previous results files, while the other functions of process 800 are repeated.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of remote data collection, comprising:
    establishing a connection with a remote machine;
    transmitting an executable file to the remote machine, wherein the executable file includes instructions to be executed by the remote machine;
    initiating retrieval of module data from the remote machine, wherein the module data was compiled by the remote machine operating under the instructions included in the executable file;
    processing the module data, with a processor, to generate usage information related to the remote machine;
    establishing a connection with a plurality of additional remote machines;
    transmitting the executable file to the additional remote machines;
    initiating retrieval of additional module data from the additional remote machines, wherein the additional module data is compiled by the additional remote machines operating under the instructions included in the executable file; and
    processing the additional module data with the module data to generate additional usage information related to additional remote machines and the remote machine, wherein the additional usage information comprises usage information representing a number of the additional remote machines of a customer site that are using a particular module, and wherein processing the additional module data comprises implementing an error policy including provisions for correcting an error on one of the additional remote machines that has not experienced an error after determining another of the additional remote machines has experienced the error.

2. The method of claim 1, wherein establishing the connection comprises:
    retrieving customer information from a customer relationship management server; and
    determining access information from the customer information to establish the connection with the remote machine, wherein the remote machine is located remotely from the customer relationship management server.

3. The method of claim 1, wherein processing the module data includes generating the usage information that includes how often the remote machine uses one or more modules loaded on the remote machine.

4. The method of claim 1, wherein processing the module data includes generating the usage information that includes diagnostic data indicating whether the remote machine has experienced any technical problems.

5. The method of claim 4 further comprising:
    determining from the diagnostic data a particular problem the remote machine has experienced;
    generating error correction data; and
    in the absence of the remote machine requesting to have the particular problem corrected, transmitting the error correction data to the remote machine to correct the particular problem.

6. The method of claim 1, wherein transmitting the executable file includes transmitting the instructions as limited to read-only instructions.

7. The method of claim 1 further comprising generating suggestion data based on the module usage information, wherein the suggestion data provides suggestions relevant to the customer site's business.

8. The method of claim 1 further comprising initiating the mass deployment of software to the additional remote machines across one or more customer sites.

9. The method of claim 1, wherein analyzing the additional module data comprises facilitating a global benchmarking system.

10. A system comprising processor configured to:
    establish a connection with a remote machine;
    transmit an executable file to the remote machine, wherein the executable file includes instructions to be executed by the remote machine;
    initiate retrieval of module data from the remote machine, wherein the module data was compiled by the remote machine operating under the instructions included in the executable file;
    process the module data to generate usage information related to the remote machine;
    establish a connection with a plurality of additional remote machines;
    transmit the executable file to the additional remote machines;
    initiate retrieval of additional module data from the additional remote machines, wherein the additional module data is compiled by the additional remote machines operating under the instructions included in the executable file; and process the additional module data with the module data to generate additional usage information related to additional remote machines and the remote machine, wherein processing the additional module data comprises implementing an error policy including provisions for correcting an error on one of the additional remote machines that has not experienced an error after determining another of the additional remote machines has experienced the error.

11. The system of claim 10 further comprising a customer relationship management server that has access to a database storing access information that is used by the processor to establish the connection with the remote machine.

12. The system of claim 10, wherein the usage information includes how often the remote machine uses one or more modules loaded on the remote machine.

13. The system of claim 10, wherein the usage information includes diagnostic data indicating whether the remote machine has experienced any technical problems.

14. The system of claim 13, wherein the processor is further configured to:

determine from the diagnostic data a particular problem the remote machine has experienced;

generate error correction data; and in the absence of receiving a request from the remote machine requesting to have the particular problem corrected, cause the transmission of the error correction data to the remote machine to correct the particular problem.

15. The system of claim 10, wherein the instructions are limited to read-only instructions.

16. A computer program product for conducting remote data collection, the computer program product comprising at least one non-transitory computer-readable storage medium having computer-executable program code instructions stored therein, the computer-executable program code instructions comprising:

program code instructions for establishing a connection with a remote machine;

program code instructions for transmitting an executable file to the remote machine, wherein the executable file includes instructions to be executed by the remote machine;

program code instructions for initiating retrieval of module data from the remote machine, wherein the module data is compiled by the remote machine operating under the instructions included in the executable file;

program code instructions for processing the module data to generate usage information related to the remote machine;

program code instructions for establishing a connection with a plurality of additional remote machines;

program code instructions for transmitting the executable file to the additional remote machines;

program code instructions for initiating retrieval of additional module data from the additional remote machines, wherein the additional module data is compiled by the additional remote machines operating under the instructions included in the executable file; and program code instructions for processing the additional module data with the module data to generate additional usage information related to additional remote machines and the remote machine, wherein the program code instructions for processing the additional module data comprises program code instructions to implement an error policy including provisions to correct an error on one of the additional remote machines that has not experienced an error after determining another of the additional remote machines has experienced the error.

17. The computer program product of claim 16, wherein the program code instructions for establishing the connection comprises:

program code instructions for retrieving customer information from a customer relationship management server; and program code instructions for determining access information from the customer information to establish the connection with the remote machine, wherein the remote machine is located remotely from the customer relationship management server.

18. The computer program product of claim 16, wherein the program code instructions for processing the module data includes program code instructions for generating the usage information that includes how often the remote machine uses one or more modules loaded on the remote machine.

19. The computer program product of claim 16, wherein the program code instructions for processing the module data includes program code instructions for generating the usage information that includes diagnostic data indicating whether the remote machine has experienced any technical problems.

* * * * *

UNITED STATES PATENT AND TRADEMARK OFFICE
CERTIFICATE OF CORRECTION

PATENT NO. : 8,843,623 B2  
APPLICATION NO. : 13/407485  
DATED : September 23, 2014  
INVENTOR(S) : Sela Page 1 of 1

It is certified that error appears in the above-identified patent and that said Letters Patent is hereby corrected as shown below:

Title page,
Insert the following:
-- Related U.S. Application Data
(60) Provisional application No. 61/447,585, filed on Feb. 28, 2011. --.

Signed and Sealed this
Twelfth Day of May, 2015

Michelle K. Lee
*Director of the United States Patent and Trademark Office*